US006499918B1

United States Patent
Murphy

(10) Patent No.: US 6,499,918 B1
(45) Date of Patent: Dec. 31, 2002

(54) APPARATUS AND METHOD FOR REPAIRING MARINE ENGINE DISTRIBUTORS

(76) Inventor: Michael E. Murphy, 301 Lady La., Michigan City, IN (US) 46360

( * ) Notice: Subject to any disclaimer, the term of this patent is extended or adjusted under 35 U.S.C. 154(b) by 165 days.

(21) Appl. No.: 09/711,742

(22) Filed: Nov. 13, 2000

(51) Int. Cl.[7] ................................................. B23G 1/48
(52) U.S. Cl. .......................... 408/87; 408/72 B; 408/97; 408/241 G; 408/72 R; 29/271; 29/402.06
(58) Field of Search ...................... 29/888.011, 402.06, 29/825, 826, 827, 828, 402.01, 418, 464, 270, 271, 281.1; 408/72 R, 72 B, 1 R, 87, 97, 115 B, 241 B, 241 G, 709; 33/637, 562

(56) References Cited

U.S. PATENT DOCUMENTS

| 2,008,436 | A |   | 7/1935  | Cross       |
|-----------|---|---|---------|-------------|
| 2,058,298 | A | * | 10/1936 | Chesley     |
| 2,915,926 | A | * | 12/1959 | Woerner     |
| 3,148,562 | A |   | 9/1964  | Moss        |
| 3,204,493 | A |   | 9/1965  | Severdia    |
| 3,280,661 | A |   | 10/1966 | Robertson   |
| 3,363,488 | A | * | 1/1968  | Thau et al. |
| 3,977,805 | A |   | 8/1976  | Wanous      |
| 4,714,386 | A | * | 12/1987 | Phillips    |
| 4,752,162 | A | * | 6/1988  | Groh        |
| 5,025,556 | A | * | 6/1991  | Stafford    |
| 5,116,170 | A | * | 5/1992  | Palmer et al. |
| 5,415,502 | A | * | 5/1995  | Dahlin      |
| 5,664,913 | A | * | 9/1997  | Scholz      |
| 5,915,891 | A | * | 6/1999  | Fridman     |
| 6,203,252 | B1 | * | 3/2001 | Dempsey     |
| 6,435,781 | B1 | * | 8/2002 | Jones       |

* cited by examiner

Primary Examiner—Gregory M. Vidovich
Assistant Examiner—Eric Compton
(74) Attorney, Agent, or Firm—Marshall, Gerstein & Borun

(57) ABSTRACT

A repair jig for drilling and retapping bores provided in a marine engine distributor is disclosed. The repair jig includes a frame having a plurality of alignment mechanisms operatively associated therewith. Bores formed in the alignment mechanisms are alignable with bores of the marine engine distributor. Once aligned, drill bits and taps can be sequentially inserted through the repair jig and into the distributor for removing broken fasteners and retapping the distributor bores, respectively.

12 Claims, 2 Drawing Sheets

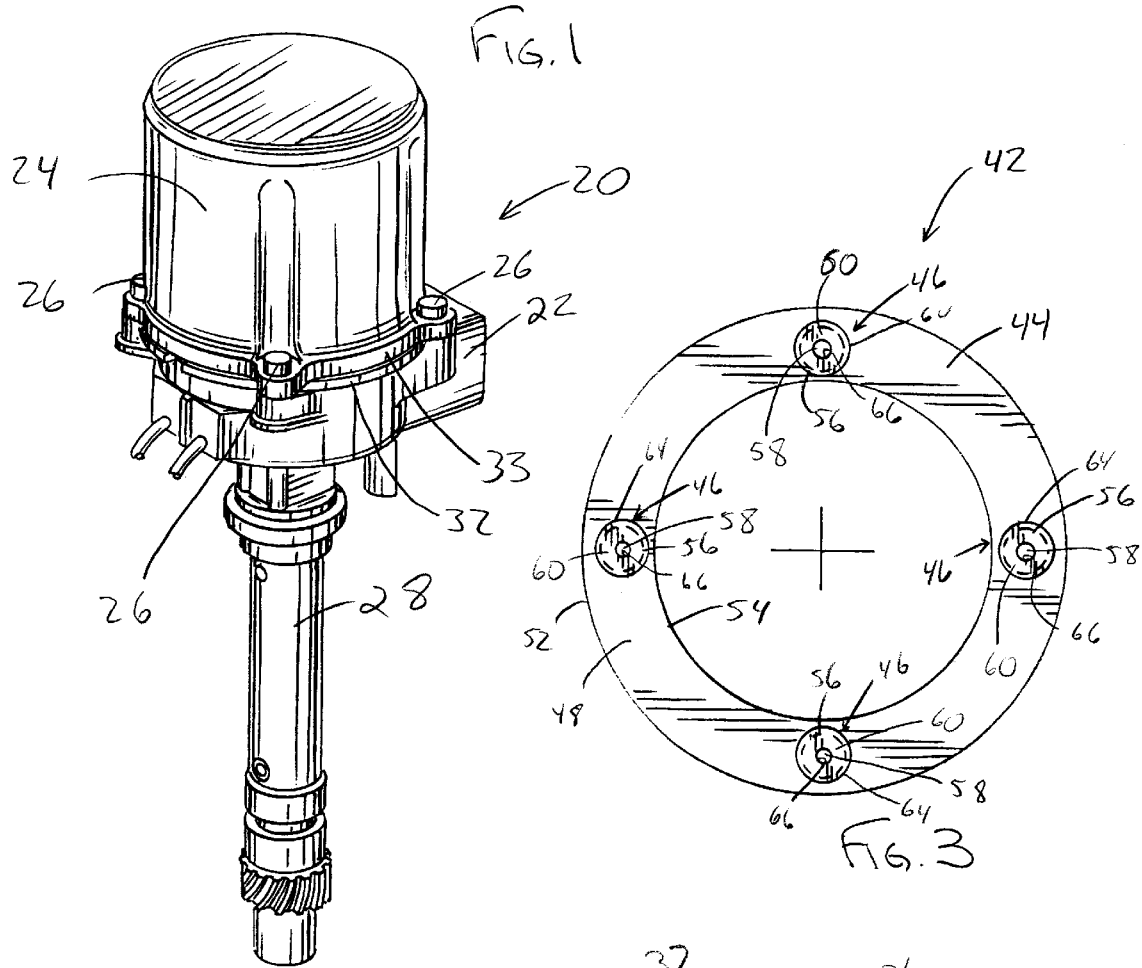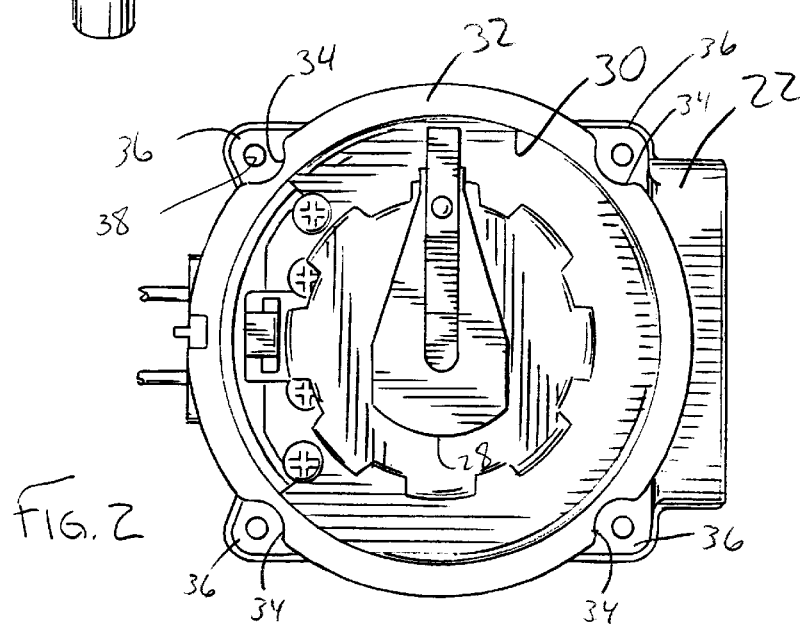

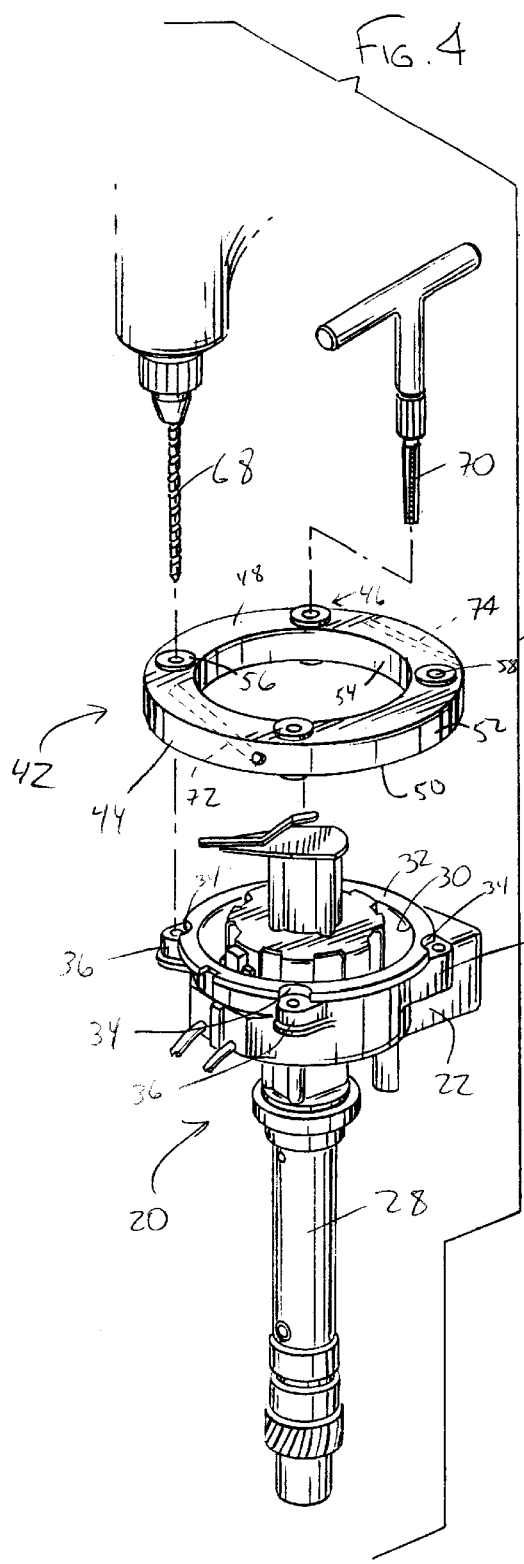

APPARATUS AND METHOD FOR REPAIRING MARINE ENGINE DISTRIBUTORS

FIELD OF THE INVENTION

The invention generally relates to repair jigs and, more particularly, relates to repair jigs and other apparatus for repairing marine engine distributors.

BACKGROUND OF THE INVENTION

In the repair or maintenance of marine engine distributors, it is necessary to remove the engine distributor cap from the distributor housing. With certain marine engines, the distributor cap is manufactured from plastic, and is attached to an aluminum distributor housing with steel screws. For example, the Mercruiser Thunderbolt™ series of engines is one example of a distributor comprised of multiple materials.

Due to the interaction between the steel and aluminum, as well as the wet environment in which the engine operates, the steel screws attaching the distributor cap to the distributor housing can often corrode. As a result, when an engine mechanic attempts to remove the screws for removal of the cap, the screws tend to seize and break off within a bore of the distributor housing.

When such screws break, this necessitates that the mechanic drill the broken screw or screws from the distributor housing, which in turn requires that the distributor housing be retapped to provide the threads necessary for a new screw to be used during reinstallation of the distributor cap. This process has proven to be extremely difficult to accomplish without damaging the distributor cap and/or housing. Even if the distributor housing is not damaged, the process is time consuming and costly.

SUMMARY OF THE INVENTION

In accordance with one aspect of the invention, a repair jig for drilling and retapping bores provided in a marine engine distributor is provided which comprises a frame, a plurality of alignment collets extending from the frame, and a registration surface provided on each alignment collet. Each collet includes an aperture therethrough. Each registration surface is adapted to engage a receiving surface of the marine engine distributor, such that the collet apertures are aligned with the engine bores upon engagement of the collet registration surfaces with the marine engine distributor receiving surfaces.

In accordance with another aspect of the invention, a method of redrilling and tapping bores of a marine engine distributor is provided which comprises the steps of placing a repair jig atop the distributor wherein the repair jig has at least one drill bit alignment opening sized to receive a drill bit and at least one tap alignment opening sized to receive a tap, aligning the drill bit opening with a fastener to be removed from the marine engine distributor, inserting a rotating drill bit through the drill bit opening to remove the fastener from a bore of the distributor, aligning the tap opening with the bore, and inserting a rotating tap into the tap opening and into the distributor bore to retap the bore.

In accordance with another aspect of the invention, a kit for repairing a marine engine distributor having at least one distributor cap attachment fastener broken off within a distributor bore is provided which comprises a frame, an alignment mechanism, a drill bit, and a tap. The frame includes at least one drill bit receiving bore and at least one tap receiving bore. The alignment mechanism is operatively associated with the frame and is adapted to align the drill bit receiving bore and the tap receiving bore with the distributor bore. The drill bit is sized to remove the broken fastener, and the tap is sized to rethread the distributor bore.

These and other aspects and features of the invention will become more apparent from following detailed description when taken in conjunction with the accompanying drawings.

BRIEF DESCRIPTION OF THE DRAWINGS

FIG. 1 is an isometric view of an engine distributor with a distributor cap attached thereto;

FIG. 2 is a top view of the distributor of FIG. 1 illustrated with the distributor cap removed;

FIG. 3 is a top view of the repair jig constructed in accordance with the teachings of the invention;

FIG. 4 is an exploded view of a distributor, a repair jig, and a drill bit and/or tap;

FIG. 5 is a cut-away sectional view of the repair jig placed atop the distributor with a drill bit extending therethrough;

FIG. 6 is a top view of an alternative embodiment of a repair jig constructed in accordance with the teachings of the invention; and FIG. 7 is a top view of a second alternative embodiment of a repair jig constructed in accordance with the teachings of the invention.

While the invention is susceptible to various modifications and alternative constructions, certain illustrative embodiments thereof have been shown in the drawings and will be described below in detail. It should be understood, however, that there is no intention to limit the invention to the specific forms disclosed but, on the contrary, the intention is to cover all modifications, alternative constructions and equivalents falling within the spirit and scope of the invention as defined by the appended claims.

DETAILED DESCRIPTION OF THE PREFERRED EMBODIMENTS

Referring now to the drawings, and with specific reference to FIG. 1, an engine distributor, the repair of which is the general field of the invention, is generally depicted by reference numeral 20. While the distributor 20 is generally depicted as a distributor for a marine engine (not shown), it is to be understood that the teachings of the invention can be employed with respect to additional types of engines as well.

As is conventional, the distributor 20 includes a housing 22 to which a distributor cap 24 is secured with threaded fasteners 26. A shaft 28 extends through the housing 22.

Referring now to FIG. 2, the distributor housing 22 is shown to include a substantially cylindrical opening 30 having a circular flange 32 which mates with a similarly shaped flange 33 of the distributor cap 24 (FIG. 1). Spaced around the perimeter of the flange 32 are a plurality of semicircular recesses 34. Mounting feet 36 radially extend from the distributor housing 22 proximate each of the recesses 34. The mounting feet 36 include internal threads 38 which are adapted to mate with external threads (not shown) provided on each threaded fastener 26 in order to secure the distributor cap 24 to the distributor housing 22.

In the event that one of the threaded fasteners 26 breaks off within one of the mounting feet 36, a repair jig 42 constructed in accordance with the teachings of the invention can be employed. As shown in FIG. 3, the repair jig 42 includes a frame 44 with a plurality of alignment mechanisms 46. In the preferred embodiment, the frame 44 is substantially circular or annular in shape and includes planar top surface 48, planar bottom surface 50, circular outer diameter surface 52 and circular inner diameter surface 54. It is to be understood that in alternative embodiments, alternative shapes for the frame 44 can be used including the semicircular shape depicted later herein.

In the preferred embodiment, the alignment mechanisms 46 are provided in the form of collets 56. Each collet 56 is substantially cylindrical in shape and includes a central bore 58 therethrough. In horizontal cross-section, each collet 56 is therefore annular in shape. Each collet 56 includes a planar top surface 60, a planar bottom surface 62, a circular outer diameter surface 64, and a circular inner diameter surface 66.

In the preferred embodiment, four such collets 56 are employed, although it is to be understood that in alternative embodiments, a different number of collets 56 may be used, with as few as two collets 56 being possible. In the depicted embodiment, two of the collets 56 include bores 58 which are sized to receive a drill bit 68, while two of the bores 58 are sized to receive a tap 70.

In order to store the drill bit 68 and tap 70 in a convenient manner, the frame 44 may include first and second storage compartments 72 and 74 (FIG. 4). In the preferred embodiment, the storage compartments 72 and 74 are provided in the form of recesses bored into the frame 44 and which are sized to frictionally receive the drill bit 68, and tap 70, respectively. Additionally, an elastomeric member such as a rubberband may be secured around the circumference of the frame 44 to additionally secure the drill bit 68 and tap 70 within the frame 44.

In operation, when it is desired to remove a threaded fastener 26, the repair jig 42 can be positioned onto the distributor housing 22 as shown best in FIG. 4. The repair jig 42 is rotated appropriately to align the alignment mechanisms 46 with the recesses 34. In so doing, the bores 58 within each collet 56 automatically align with the threaded opening of each mounting foot 36. Initially, one of the collets 56 having a bore 58 sized to receive the drill bit 68 is aligned with the threaded fastener 26 and the drill bit 68, powered by a source of rotational power, such as a power or hand drill is inserted through the bore 58 and through the housing 22 to remove the threaded fastener 26. Once the distributor fastener 26 is removed, the repair jig 42 is rotated to align one of the collets 56 having a bore 58 sized to receive the tap 70 into alignment with the bore created by the drill bit 68. The tap 70 therefore forms threads in the mounting foot 36 as best shown in FIG. 5.

The repair jig 42, drill bit 68, and tap 70 may be provided in a single package or kit 76 to facilitate storage and usage.

Referring now to FIG. 6, an alternative embodiment of the invention is depicted. The alternative embodiment includes a frame 78 which is substantially semicircular in shape. Semicircular frame 78 includes first and second collets 80 which are identical to the collets depicted in FIGS. 2–5. Accordingly, the outer surface 82 of each collet 80 defines a registration surface which is adapted to engage the complementary shaped recess 34 provided in the distributor housing 22. Such an arrangement provides a convenient mechanism by which the repair jig 42 can be easily aligned with the distributor housing 22.

Referring now to FIG. 7, a second alternative embodiment of the invention is depicted wherein a frame 83 is provided with a plurality of alignment openings 84. Rather than employing collets 56, the alternative embodiment aligns the frame 82 with the distributor housing 22 simply by inserting fasteners, such as threaded screws and bolts, through the openings 84 and into an opening of one of the mounting feet 36 in repair. In so doing, one of the openings 84 will be aligned with the foot 36 needing repair. The drill bit 68 and tap 70 then can be sequentially inserted as described above.

From the foregoing, one of ordinary skill in the art will appreciate that the invention provides an apparatus and method for repairing a marine engine distributor which improves accuracy, reduces distributor damage, and lessens repair time and cost.

What is claimed is:

1. A repair jig for drilling and retapping bores provided in a marine engine distributor, comprising:
   a frame;
   a plurality of alignment collets extending from the frame, each collet including an aperture therethrough; and
   a registration surface provided on each alignment collet, each registration surface being adapted to engage a receiving surface of the marine engine distributor, the collet apertures being alignable with the engine bores upon engagement of the collet registration surfaces with the marine engine distributor receiving surfaces.

2. The repair jig of claim 1 wherein the frame is substantially circular.

3. The repair jig of claim 1 wherein the frame is substantially semicircular.

4. The repair jig of claim 1 further including at least one storage compartment adapted to receive a drill bit and tap.

5. The repair jig of claim 4 wherein the at least one storage compartment is formed in the frame.

6. The repair jig of claim 5 wherein the at least one storage compartment includes first and second bores formed in the frame, the first and second bores being sized to frictionally receive a drill bit and a tap, respectively.

7. The repair jig of claim 1 wherein the frame includes a plurality of openings, one of the alignment collets extending through each of the openings.

8. The repair jig of claim 1 wherein the plurality of alignment collets are welded to the frame.

9. The repair jig of claim 1 wherein the frame is manufactured from metal.

10. The repair jig of claim 1 wherein the frame is manufactured from plastic.

11. The repair jig of claim 1 wherein at least one of the alignment collet openings is sized to receive a drill bit for removing a fastener from the distributor housing.

12. The repair jig of claim 1 wherein at least one of the alignment collet openings is sized to receive a tap for rethreading a bore of the distributor housing.

* * * * *